(12) United States Patent
Loomans

(10) Patent No.: US 10,215,886 B2
(45) Date of Patent: Feb. 26, 2019

(54) PLANE-SURFACE INTERSECTION ALGORITHM WITH CONSISTENT BOUNDARY SUPPORT

(71) Applicant: Marijn Loomans, The Hague (NL)

(72) Inventor: Marijn Loomans, The Hague (NL)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 381 days.

(21) Appl. No.: 15/048,212

(22) Filed: Feb. 19, 2016

(65) Prior Publication Data
US 2017/0242155 A1   Aug. 24, 2017

(51) Int. Cl.
*G01V 99/00* (2009.01)
*G06T 17/05* (2011.01)

(52) U.S. Cl.
CPC ............ *G01V 99/005* (2013.01); *G06T 17/05* (2013.01); *G01V 2210/6242* (2013.01); *G01V 2210/6246* (2013.01); *G01V 2210/642* (2013.01)

(58) Field of Classification Search
CPC .................................................. G01V 99/005
USPC ............................................................ 703/6
See application file for complete search history.

(56) References Cited

U.S. PATENT DOCUMENTS

| 6,119,404 A | 9/2000 | Bschorr et al. |
| 2004/0193960 A1 | 9/2004 | Vassilev |
| 2011/0310101 A1 | 12/2011 | Prange et al. |

FOREIGN PATENT DOCUMENTS

EP    2778724 A2    9/2014

OTHER PUBLICATIONS

Marques, et al.; "Adaptive Precision Based Fast Algorithms for Robust Surface Intersections"; Mecanica Computacional; vol. XXIX; 2010; Retrieved from the internet:; URL://http://webserver2.tecgraf.puc-rio.br/~lfm/papers/Marques-MECOM-CILAMCE-2010.pdf; 25 pages.
European Search Report for related European Application No. 17155424.9; dated: Jul. 11, 2017; 12 pages.

*Primary Examiner* — Saif A Alhija
(74) *Attorney, Agent, or Firm* — Cantor Colburn LLP

(57) ABSTRACT

A method for determining an intersection between a polygon representing a boundary of a surface in an earth formation and a plane includes: receiving a polygon representing a boundary of a surface in an earth formation, the polygon having a series of straight segments with a point at each end of each of the segments; overlaying a cutting grid having grid planes over the polygon; identifying a specific pattern of two adjacent segments in the polygon by proceeding from a first segment to a second segment in a selected rotational direction; matching the specific pattern to a reference pattern; categorizing the point between the two adjacent segments as an intersection point or as a non-intersection point based on the reference pattern; the iterating the identifying, matching, and categorizing for each pair of adjacent segments in the polygon such that each point between adjacent segments in the polygon is categorized.

18 Claims, 11 Drawing Sheets

| Drawing in Figure 5– | a | b | c | d | e | f | g | h | i | j | k | l | m | n | o |
|---|---|---|---|---|---|---|---|---|---|---|---|---|---|---|---|
| Current segment | + | – | + | – | + | – | o | o | + | – | + | – | o | o | o |
| Next segment | + | – | + | – | – | + | + | – | o | o | o | o | + | – | o |
| Rotation current to next segment | CW | CW | CCW | CCW | N/A | N/A | CW | CCW | CW | CCW | CCW | CW | CCW | CW | N/A |
| Valid intersection | Yes | Yes | No | No | Yes | Yes | Yes | No | Yes | No | No | Yes | No | Yes | No |

Case o – not illustrated in FIG.5

FIG.6

PLANE-SURFACE INTERSECTION ALGORITHM WITH CONSISTENT BOUNDARY SUPPORT

BACKGROUND

Mathematical models of geological formations have many uses for hydrocarbon production. Formation models may include both rock fractures and faults and distinct transitions between different deposited rock formations that can contribute to the flow and containment of hydrocarbons and thus provide an estimate of an amount of producible hydrocarbons. Once the amount is estimated, further steps may be taken such as determining the economic feasibility of production from the formation and a suitable location of a well. Other factors may also be determined from the formation model such as stress at each of the fractures and subsidence of formation rock and likelihood of an earthquake after extraction. The accuracy of corresponding estimations and determinations depends on the accuracy of the formation model. Hence, improvement in the accuracy of formation models would be well received in the drilling and production industries.

BRIEF SUMMARY

Disclosed in a method for determining an intersection between a polygon representing a boundary of a surface in an earth formation and a plane. The method includes: receiving a polygon representing a boundary of a surface in an earth formation using a processor, the polygon having a series of straight segments with a point at each end of each of the segments; overlaying a cutting grid having grid planes over the polygon using the processor; identifying a specific pattern that represents a first segment adjacent to a second segment in the polygon by proceeding from the first segment to the second segment in a selected rotational direction using the processor; matching the specific pattern to a reference pattern using the processor, the reference pattern having indication that the point between the first segment and the second segment is an intersection point or a non-intersection point based on pattern criteria having a position the first segment with respect to a cutting plane in the cutting grid, a position of the second segment with respect to the cutting plane, and the rotational direction going from the first segment to the second segment; categorizing the point between the two adjacent segments as an intersection point or as a non-intersection point based on the reference pattern using the processor; iterating the identifying, the matching, and the categorizing for each pair of adjacent segments in the polygon such that each point between adjacent segments in the polygon is categorized using the processor; calculating a parameter of the earth formation with the intersection points as input using the processor; and performing an action related to the earth formation using the parameter and associated equipment for performing the action.

Also disclosed is a system for determining an intersection between a polygon representing a boundary of a surface in an earth formation and a plane. The system includes: a memory having computer readable instructions and a processor for executing the computer-readable instructions. The computer-readable instructions include: receiving a polygon representing a boundary of a surface in an earth formation, the polygon includes a series of straight segments with a point at each end of each of the segments; overlaying a cutting grid having grid planes over the polygon; identifying a specific pattern that represents a first segment adjacent to a second segment by proceeding from the first segment to the second segment in a selected rotational direction; matching the specific pattern to a reference pattern, the reference pattern having indication that the point between the first segment and the second segment is an intersection point or a non-intersection point based on pattern criteria having a position the first segment with respect to a cutting plane in the cutting grid, a position of the second segment with respect to the cutting plane, and the rotational direction going from the first segment to the second segment; categorizing the point between the two adjacent segments as an intersection point or as a non-intersection point based on the reference pattern; iterating the identifying a specific pattern, the identifying a reference pattern, and the categorizing the point for each pair of adjacent segments in the polygon so that each point between adjacent segments in the polygon is categorized; and calculating a parameter of the earth formation with the intersection points as input. The system further includes equipment configured for performing an action related to the earth formation using the parameter.

BRIEF DESCRIPTION OF THE DRAWINGS

The following descriptions should not be considered limiting in any way. With reference to the accompanying drawings, like elements are numbered alike:

FIG. 6 depicts rules to determine whether each of the 15 possible plane-polygon intersections (14 are depicted in FIG. 5) is valid or not;

FIG. 7 depicts further aspects of the intersection illustrated in FIG. 5a;

DETAILED DESCRIPTION

A detailed description of one or more embodiments of the disclosed apparatus and method is presented herein by way of exemplification and not limitation with reference to the figures.

Figure 1:
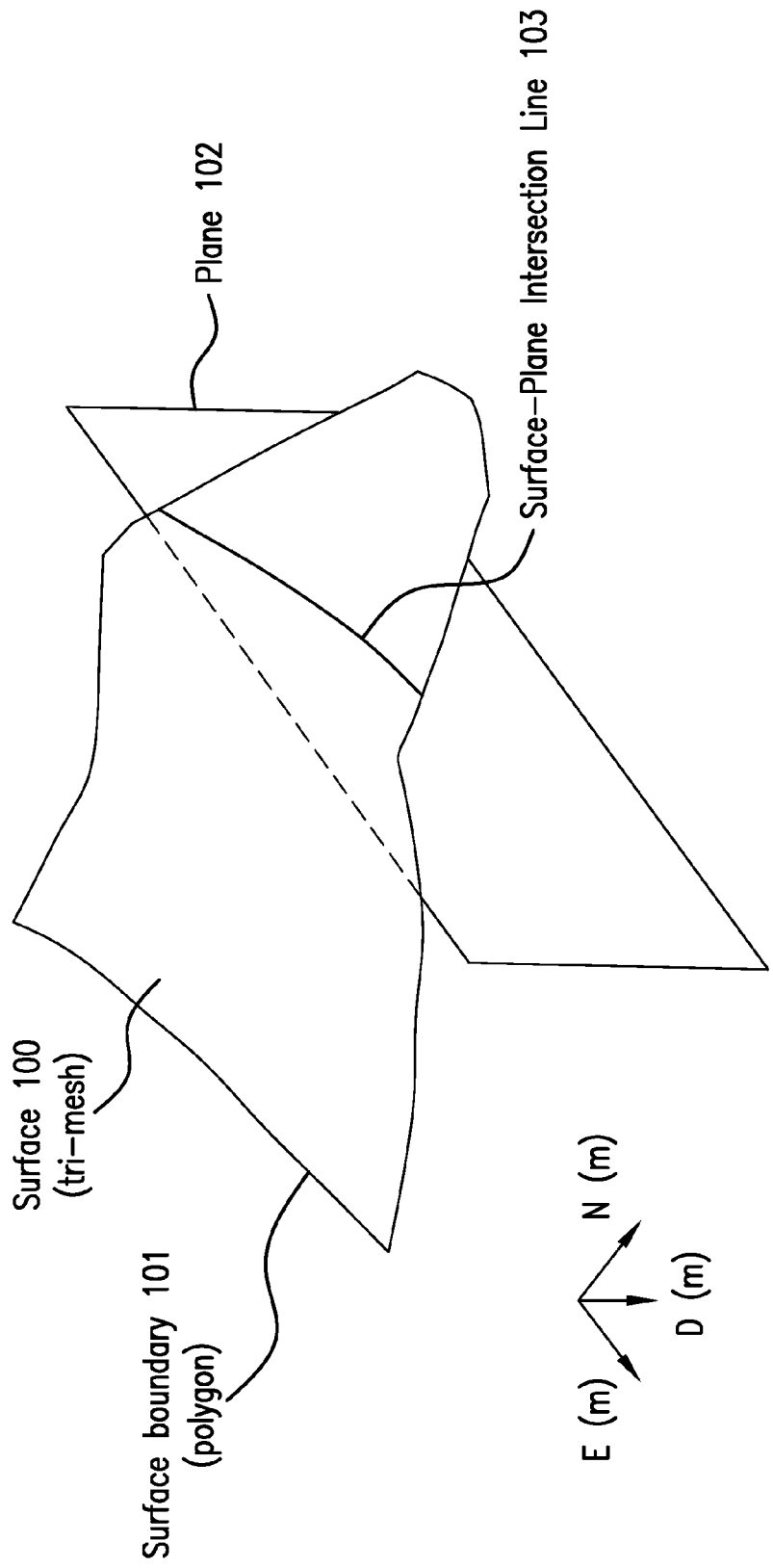
FIG. 1 depicts aspects of an intersection between a plane and a surface.

Disclosed is a method implemented by a processor for finding an intersection between a plane and a surface as illustrated in FIG. 1. The surface may represent a surface of rock such as a fault boundary in a mathematical model of a geological formation. The plane may represent a plane in a grid having a plurality of planes for mathematically representing the geometry of the surface or boundary for computational purposes. The grid and planes may be referred to a cutting grid or cutting planes, respectively, because the planes in the grid can virtually cut across a surface or boundary. FIG. 1 illustrates a surface 100 (made up of a tri-mesh), a surface boundary 101, a plane 102 and a surface-plane intersection line 103. The method provides proper and consistent boundary handling and thus improves the accuracy of representing the boundary-plane intersections and consequently the surface-plane intersection line 103, which in turn improves the accuracy of further processing to estimate or determine various factors related to the formation such as permeability. The various factors in turn may be used to perform an action related to the earth formation such as determining a location for drilling a borehole, drilling a borehole at the determined location with a specific geometry, or extracting hydrocarbons according to a production process.

Figure 2:
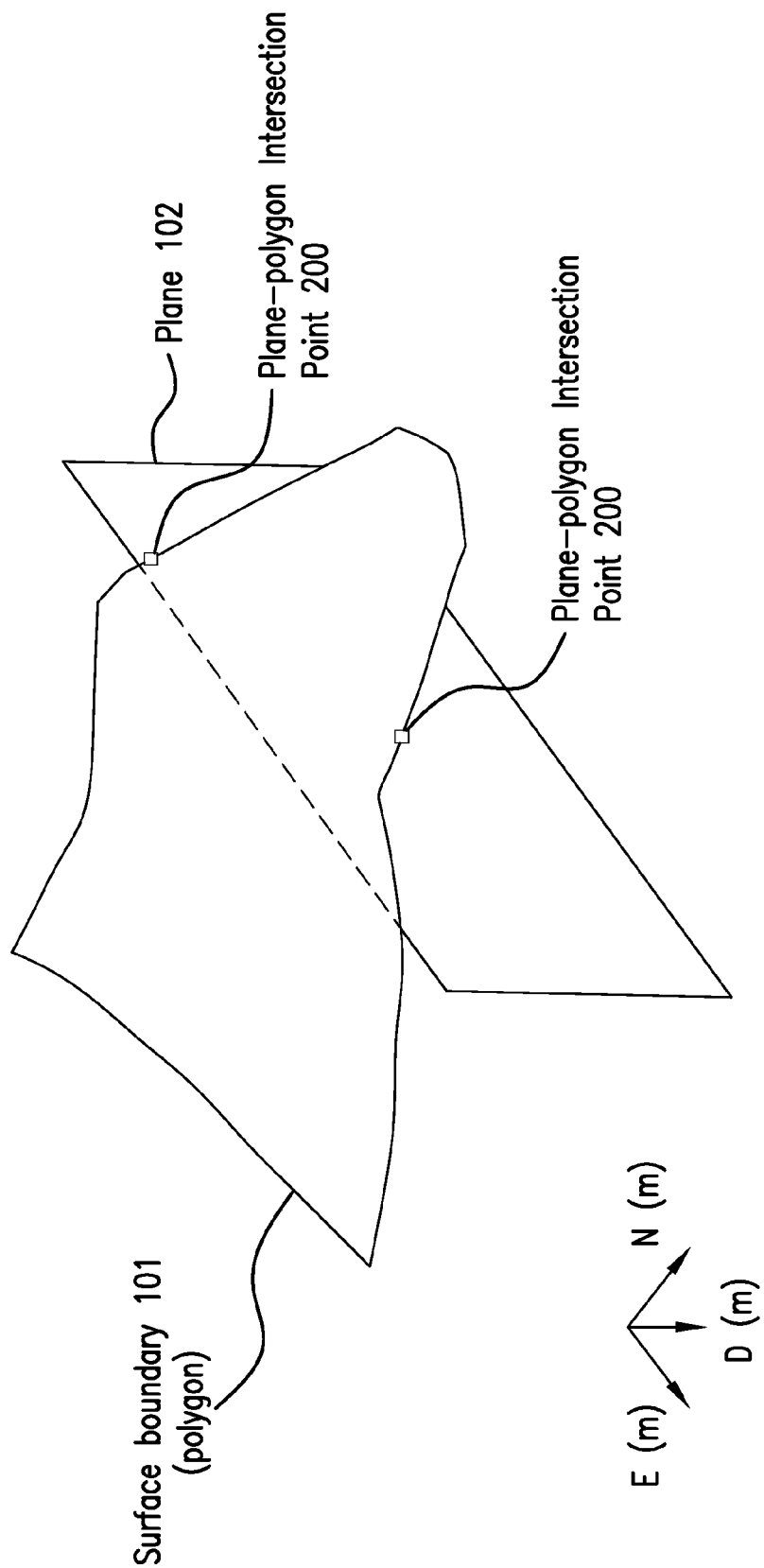
FIG. 2 depicts aspects of finding the intersection between a surface-boundary polygon and a plane.
Figure 3:
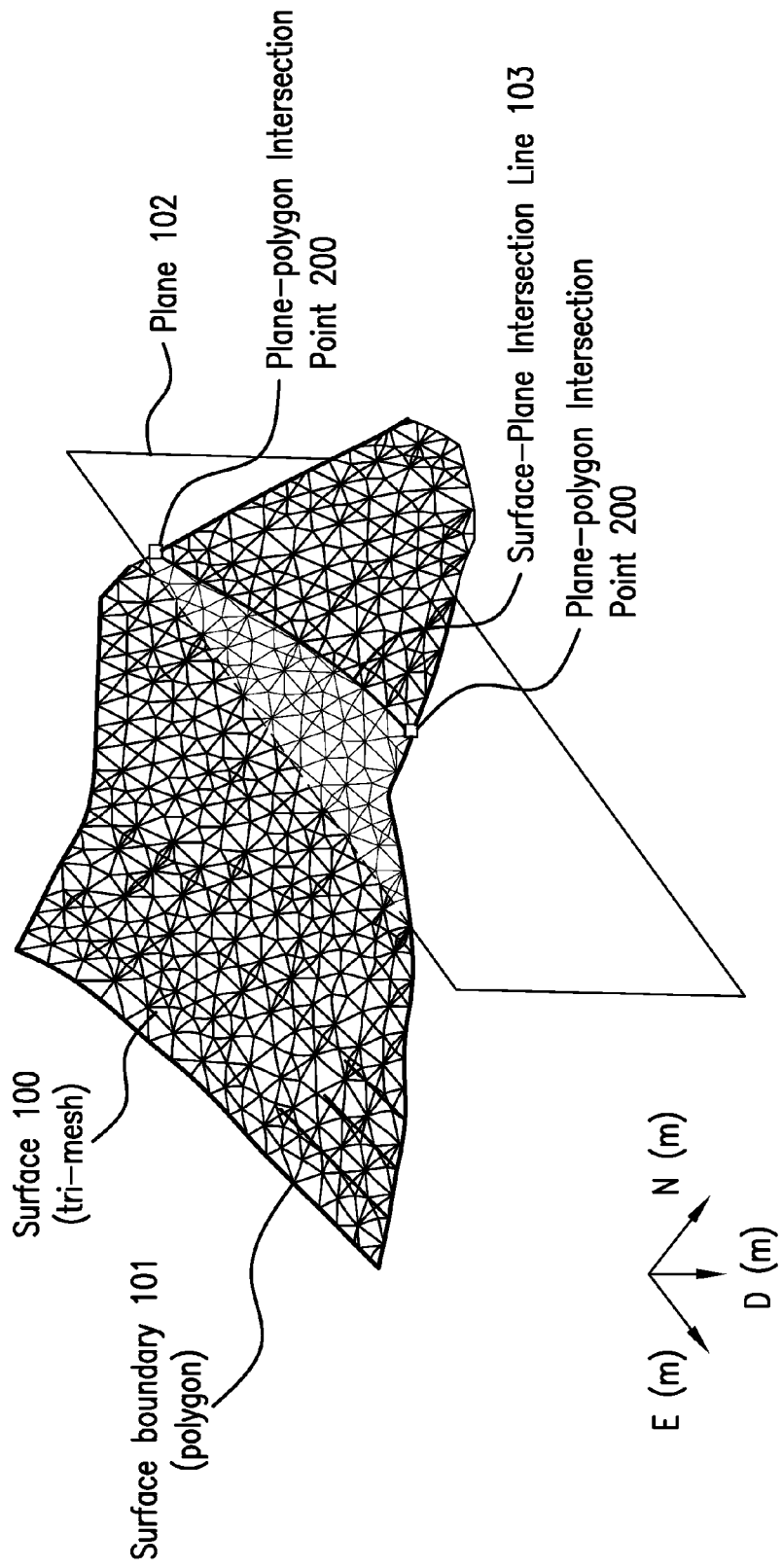
FIG. 3 depicts aspects of an intersection line exactly on the plane following the surface representation where the intersection line runs from one boundary-plane intersection to another.

To calculate the surface-plane intersection, an intersection between the surface-boundary polygon 101 and the plane 102 is first found. (The plane 102 may be a cutting plane in a cutting grid for analyzing the surface.) This provides at least two plane-polygon intersection points 200 as illustrated in FIG. 2. The tri-mesh is then traversed from one plane-boundary intersection point 200 to the other plane-boundary intersection point 200 along the plane 102. If this path can be found, then the surface-plane intersection line 103 is found as illustrated in FIG. 3. Difficulties may arise when the polygon is exactly on the plane 102. Then, it becomes difficult to define whether or not a plane-polygon intersection point 200 is actually there. The methods disclosed herein accommodate these situations.

Figure 4:
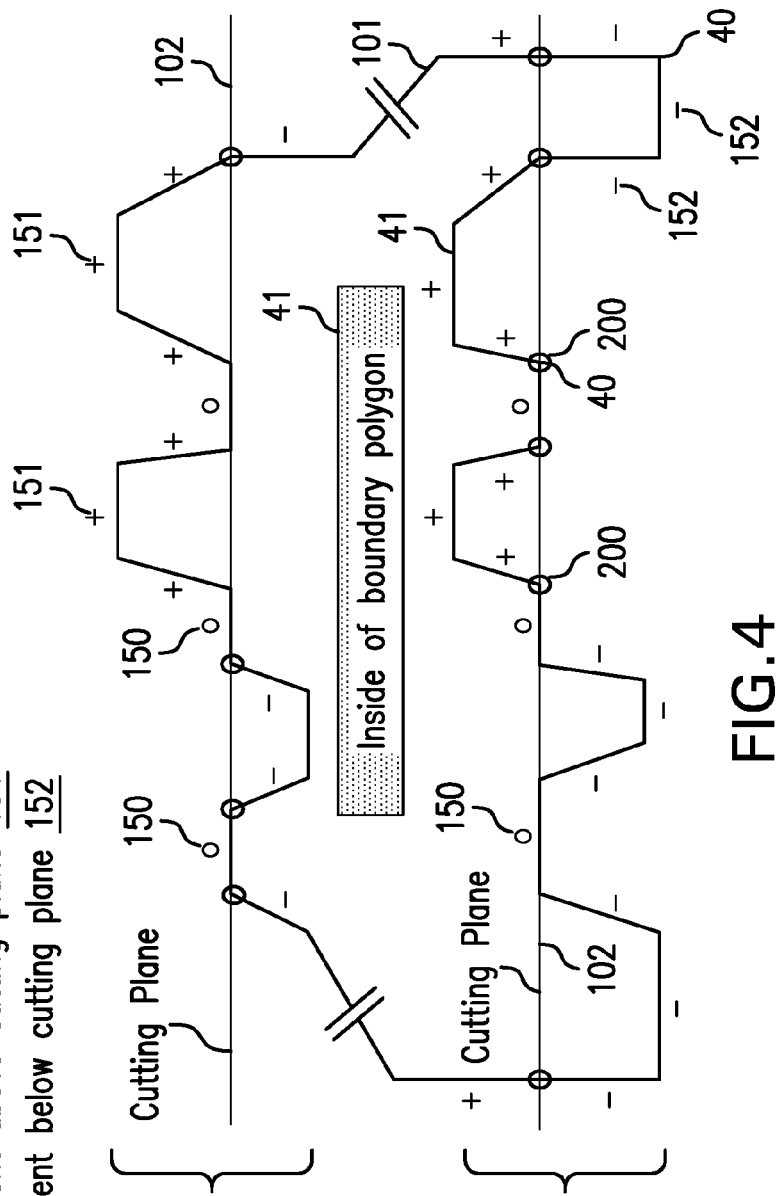
FIG. 4 depicts aspects of all plane-polygon intersections that are possible based on a valid boundary intersection, a segment below a cutting plane, and segment above a cutting plane.

Definitions regarding points and segments are now presented for understanding the methods disclosed herein. As depicted in FIG. 4, a point 40 on the boundary 101 can be either: (1) exactly on the plane 102, (2) below the plane 102, or (3) above the plane 102. Above or below the plane 102 is calculated as the signed distance from the plane, where positive or negative values are determined by the plane's normal (i.e., vector perpendicular to the plane). A line segment only exists if there is an intersection with the plane and is one of four types of line segments. The four types of line segments are: (C) or 'cross' type where there is a first point 40 on one side of the plane and a second point 40 of the other side of the plane; (o) or 'on-plane' type 150 where both points 40 are on the plane; (+) or 'above the plane' type 151 where one of the points 40 is above the plane and the other point 40 is on the plane; and (−) or 'below the plane' type 152 where one of the points 40 is below the plane and the other point is on the plane. Note that if both points 40 are above or below the plane, there is no intersection, and therefore no segment.

The cross segment type always leads to a valid plane-polygon intersection point. For the other three segment types, many combinations can occur that sometimes lead to a valid plane-polygon intersection and sometimes not. The different combinations are discussed below.

FIG. 4 illustrates all plane-polygon intersections that are possible based on a combination of 0, + and − segments, depicted by 150, 151 and 152, respectively. The closed loop line 101 depicts the closed boundary polygon (in this embodiment in a clockwise rotation) with all plane-polygon intersection cases possible. The horizontal lines 102 indicate cutting planes and the larger diameter open circles 200 around the closed loop line 101 encircle the points 40 that are defined as valid intersection points. Hence, the circles 200 identify valid intersection points, which may be referred to as valid intersection points 200. The inside of the boundary polygon is indicated by the dotted area 41. Note that even though the line 101 overlaps with the plane at several locations, not all these overlaps are considered valid intersections. This is a noted aspect for creating consistent intersections. Furthermore, it is important that an even number of intersections is found for each surface-plane intersection line, as the each surface-plane intersection line is defined to only contain two valid intersection points 200 with the boundary 101.

Figure 5:
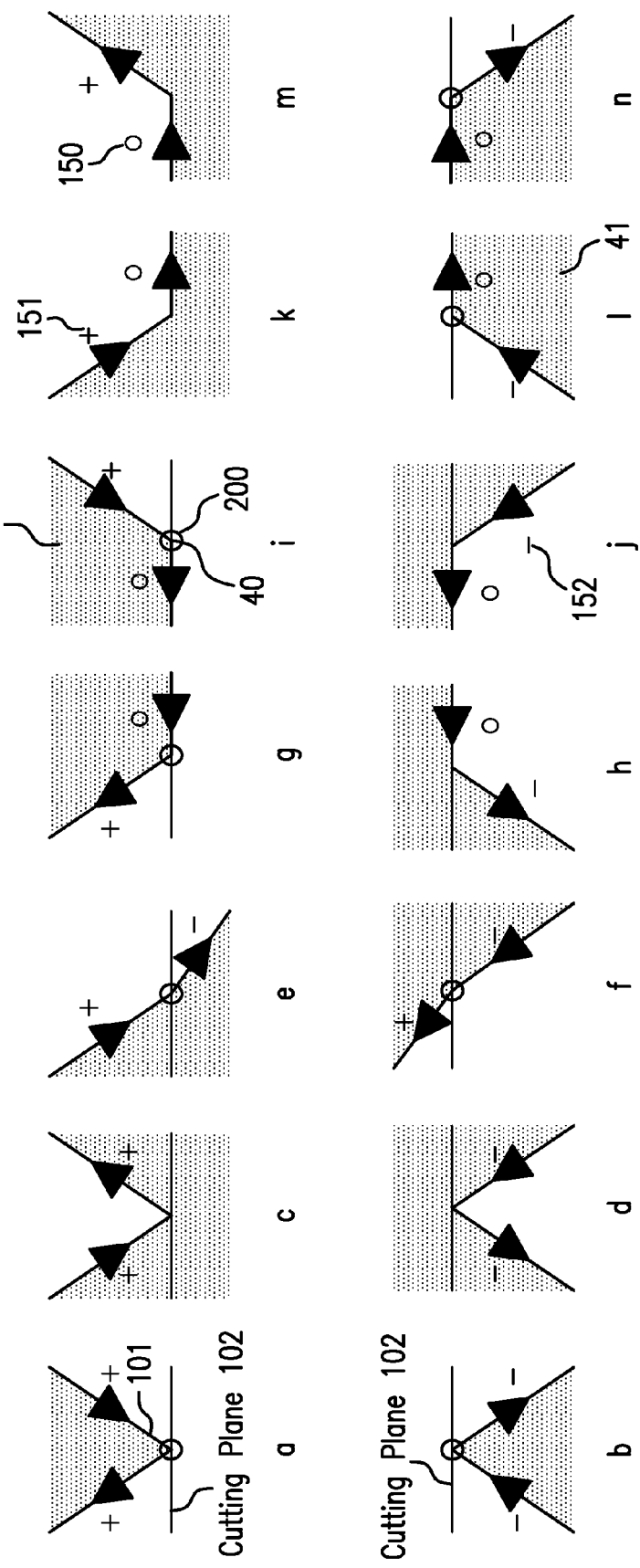
FIGS. 5a-5n, collectively referred to as FIG. 5, depict aspects of 14 out of 15 possible plane-polygon intersections.

All possible plane-polygon intersections can be described by one of 15 cases, 14 of which are illustrated in FIGS. 5a-5n. The 15th case is o-o which does not lead to a valid boundary intersection. In FIG. 5, (o) indicates the line segment is 'on the plane' 150, (+) indicates the line segment is 'above the plane' 151, (−) indicates the line segment is 'below the plane' 152.

Valid intersection points are found by going through the boundary points and checking the type of the current segment. Note that if both surface boundary points are below or above the plane, then the line is not a valid segment and is skipped. 'C' (cross) segments always include a valid intersection point on that segment itself. For −/+/o segments, the following criteria need to be looked at and analyzed: (1) the type of the current segment (e.g., −/+/o); (2) the type of the next segment (e.g., −/+/o/C); and (3) the rotation direction from the current to the next segment, where the rotation direction is based on a 3-axis coordinate system defined by the projection normal in a 3-dimensional system. (For the included figures, the projection normal is a vector perpendicular to the plane and pointing in. For two-dimensional cases, the rotation is defined without a projection normal, just by clockwise or counter-clockwise indication.) If the next segment is C, then the current point (end point of current segment, start point of next segment) cannot be a valid plane-polygon intersection. For the remaining combinations, all these 3 pieces of information are needed to determine if the current point is a valid intersection point. For this, a decision making pattern is presented, which is depicted in FIG. 6 for the 15 cases described above. (CW) indicates clockwise rotation, (CCW) indicates counter-clockwise rotation, and (N/A) indicates that a rotational direction is not applicable (i.e., the rotational direction can be CW or CCW).

Figure 7:
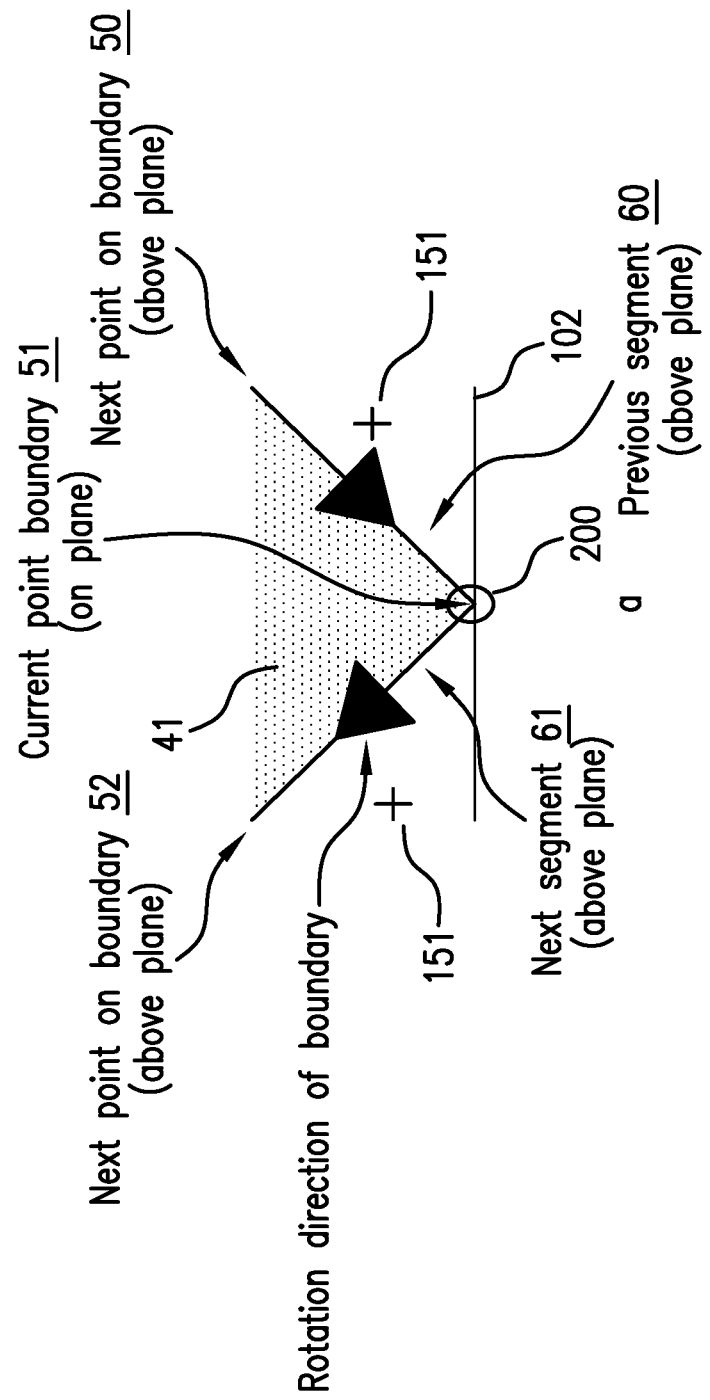

An example using the decision making pattern in FIG. 6 for case "a" is illustrated separately in FIG. 7 for clarity, and now discussed. Applying the first criterion, previous segment 60 is above plane (+) 151 (i.e., line segment from previous point 50 (above plane) to current point 51 on boundary and on plane). Applying the second criterion, next segment 61 is above the plane (+) 151 (i.e., line segment from current point 51 (on plane) to next point 52 on boundary and above plane). Applying the third criterion, there is a clockwise rotation (CW) from the current segment 60 to the next segment 61. Hence, according to the decision making pattern of FIG. 6, the current point 51 is a valid intersection point 200. Cases b-n may be interpreted similarly.

Figure 8:
FIG. 8 depicts condensed rules to determine whether an intersection is valid or not.

The rules depicted in FIG. 6 can be summarized by the following groupings illustrated in FIG. 8. For Group I, +→+, −→− (same type, no 'o') and o→+, +→o, o→−, −→o (one 'o' involved): if rotation is right, then current point is a valid intersection point; or if rotation is left, then current point is not a valid intersection point. For Group II, if line segments have opposing sign types, +→− or −→+, then current point is a valid intersection point. For Group III, if line segments are o→o (i.e., same type, 'o'), then current point is not a valid intersection point.

By applying the above rules, valid intersection points between a surface boundary and a plane can be precisely and consistently determined. The pairs of intersection points are then used to find the surface-plane intersection line. The resulting surface-plane intersection line may then be input into algorithms for estimating a property of an earth formation. Once one or more properties are estimated, then one or more actions can be performed with respect to the earth formation using drilling and/or production equipment.

Figure 9:
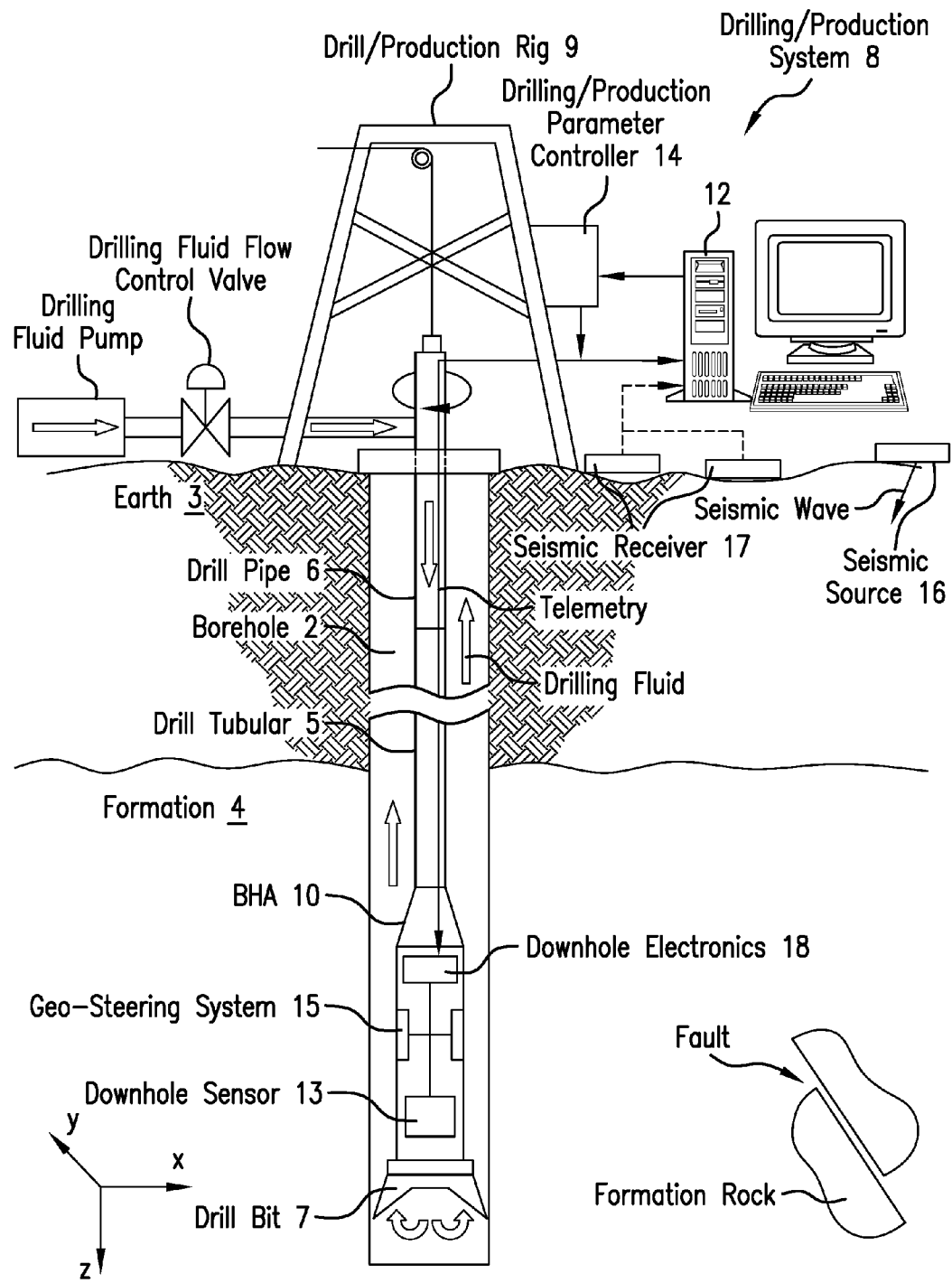
FIG. 9 illustrates a cross-sectional view of an embodiment of a drill/production rig.

Drilling and/or production equipment is now discussed for performing one or more actions with respect to an earth formation. FIG. 9 is a cross-sectional view of a borehole 2 penetrating the earth 3, which includes a formation 4. The formation 4 includes formation rock that has faults or fractures. A seismic source 16 is configured to emit a seismic wave that travels through the formation 4 and is received by seismic receivers 17. Data from the seismic receivers is processed by a computer processing system 12 to provide a tri-mesh representation of the surfaces of the formation rock to include faults and how the faults are interconnected.

A drilling/production system 8 includes a drill/production rig 9 that is configured to drill the borehole 2 and/or extract hydrocarbons from the formation 4 via the borehole 2. A drill bit 7 is disposed at the distal end of a drill tubular 5 for drilling the borehole 2. The drill tubular 5 may be a drill string made up of a plurality of connected drill pipes 6. Drilling fluid or mud is pumped through the drill tubular 5 to lubricate the drill bit 7 and flush cuttings from the borehole 2. The drilling fluid is pumped by a drilling fluid pump and a flow rate of the drill fluid is controlled by a drilling fluid control valve. The drilling fluid pump and flow control valve may be controlled by a drilling/production parameter controller 14 to maintain a suitable pressure and flow rate to prevent the borehole 2 from collapsing. Suitable drilling fluid pressure and flow parameters may be determined by knowing the stresses of the formation rock, which can be determined from representation of the surfaces of the formation rock, which are in turn determined using valid intersection points between a surface boundary and a plane and the related surface-plane intersection line. The drilling/production parameter controller 14 is configured to control, such as by feedback control for example, parameters used to drill the borehole 2 and/or extract hydrocarbons via the borehole 2. Suitable flow rate for extraction may be determined from knowing the porosity of the formation rock, which can be determined from representation of the surfaces of the formation rock. The drill tubular 5 includes a bottomhole assembly (BHA) 10. The BHA 10 includes a downhole sensor 13 configured for sensing various downhole properties or parameters related to the formation 4, the borehole 2, and/or position of the BHA 10. Sensor data may be transmitted to the surface by telemetry for processing such as by the computer processing system 12. Sensor data may also be used to determine the geometry of subsurface surfaces for the tri-mesh representation. The BHA 10 may also include a geo-steering system 15. The geo-steering system 15 is configured to steer the drill bit 7 in order to drill the borehole 2 according to a selected path or geometry. The path or geometry in general is selected to optimize hydrocarbon production from the borehole 2 and to ensure that the stress on the formation due to the borehole along the path does not exceed the strength of the formation material. The optimized geometry may be determined from representation of the surfaces of the formation rock. Steering commands may be transmitted from the drilling/production parameter controller 14 to the geo-steering system 15 by the telemetry. Telemetry in one or more embodiments may include mud-pulse telemetry or wired drill pipe. Downhole electronics 18 may process data downhole and/or act as interface with telemetry.

Figure 10A:
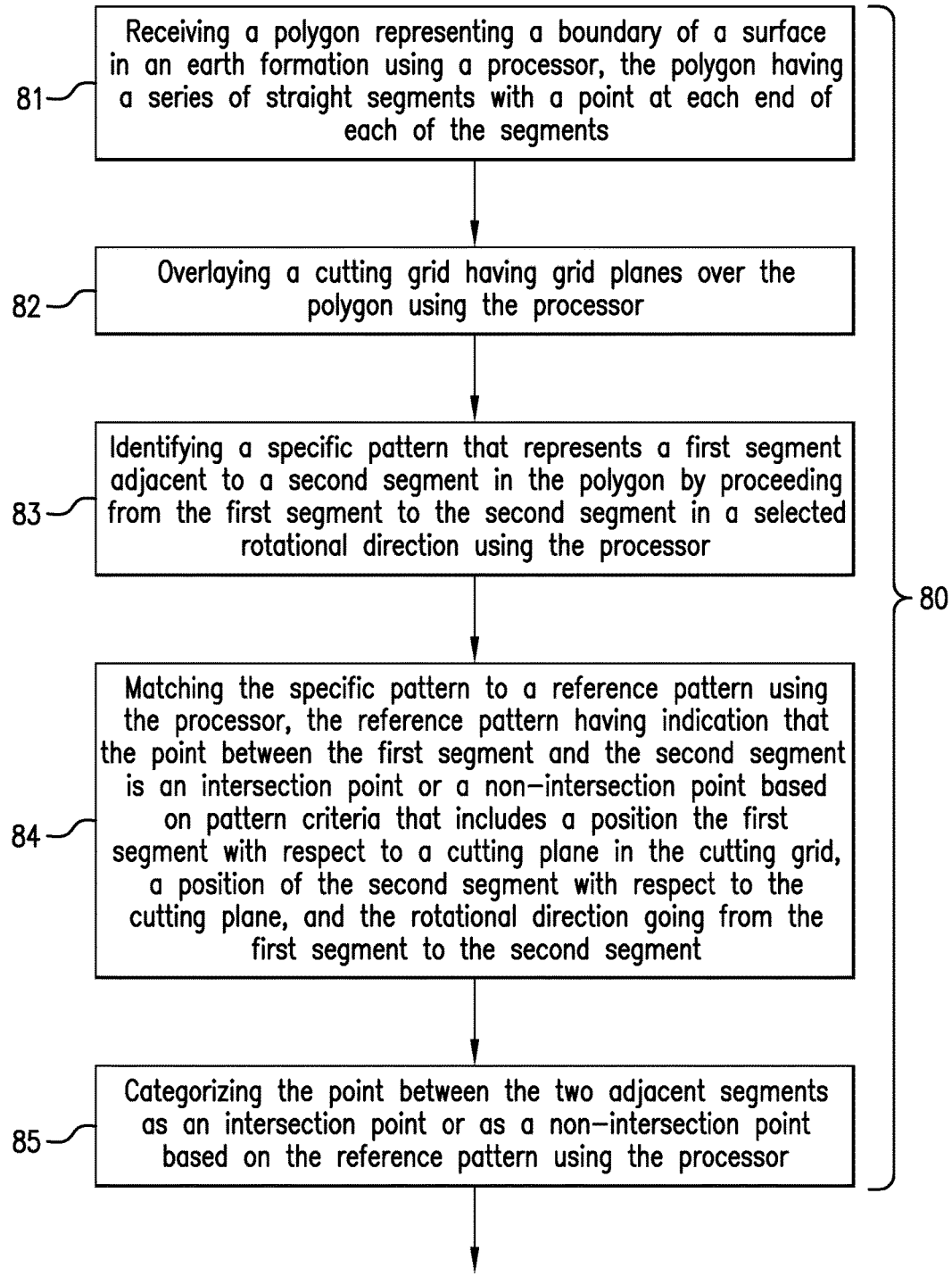
FIGS. 10A-10B, collectively referred to as FIG. 10, are a flow chart for a method for finding an intersection between a plane and a surface.
Figure 10B:
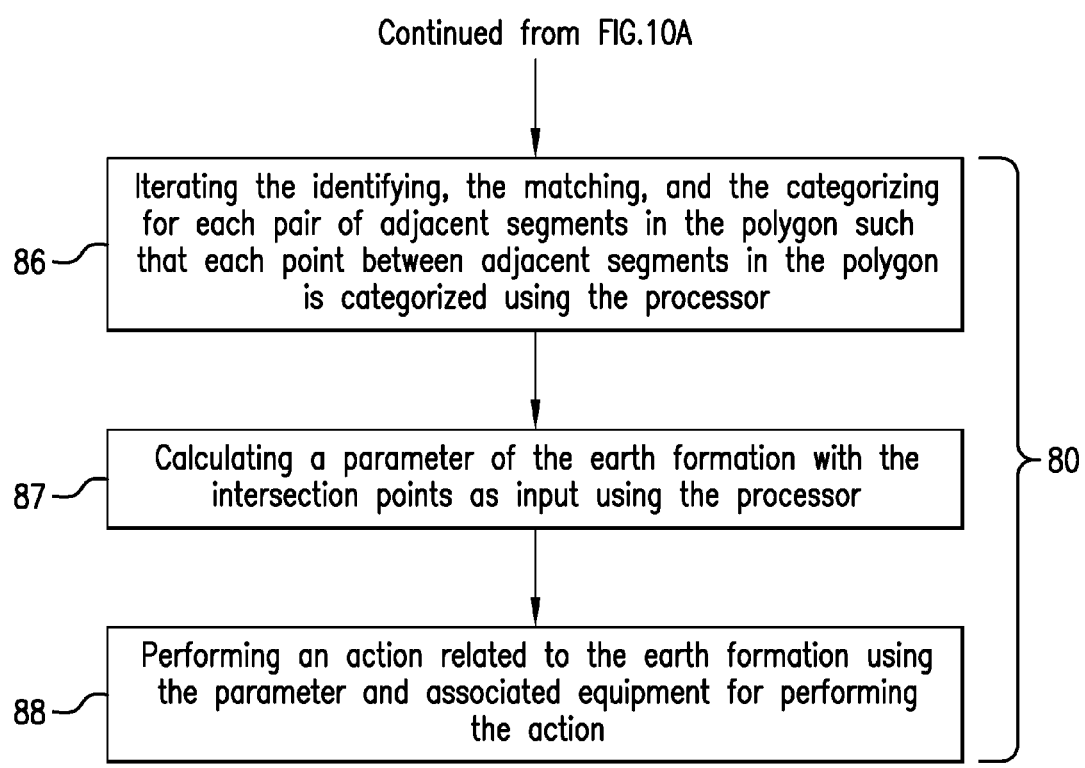

FIG. 10 is a flow chart for a method 80 for determining an intersection between a polygon representing a boundary of a surface in an earth formation and a plane. The term "polygon" relates to a closed loop made up of a series of straight lines or segments with vertices between segments referred to as points. The term "surface" relates to various geological features that may be represented such as: rock boundaries, rock fractures (faults), depositional transitions (horizons), erosion events (unconformities), salt domes (intrusions) or similar geological features. Blocks in the method 80 related to processing data are implemented by a processor such as in a computer processing system for example. Block 81 calls for receiving a polygon representing a boundary of a surface in an earth formation using a processor, the polygon having a series of straight segments with a point at each end of each of the segments. Block 82 calls for overlaying a cutting grid having grid planes over the polygon using the processor.

Block 83 calls for identifying a specific pattern that represents a first segment adjacent to a second segment in the polygon by proceeding from the first segment to the second segment in a selected rotational direction using the processor. The specific pattern includes the location of the first segment with respect to the cutting plane, the location of the second segment with respect to the cutting plane, and the rotational direction going from the first segment to the second segment.

Block 84 calls for matching the specific pattern to a reference pattern using the processor, the reference pattern having indication that the point between the first segment and the second segment is an intersection point or a non-intersection point based on pattern criteria that includes a position of the first segment with respect to a cutting plane in the cutting grid, a position of the second segment with respect to the cutting plane, and the rotational direction going from the first segment to the second segment. In one or more embodiments, the reference pattern is one of a plurality of reference patterns such as the reference patterns illustrated in FIG. 5.

Block 85 calls for categorizing the point between the two adjacent segments as an intersection point (i.e., valid intersection point) or as a non-intersection point (non-valid intersection point) based on the reference pattern using the processor.

Block 86 calls for iterating the identifying, the matching, and the categorizing for each pair of adjacent segments in the polygon such that each point between adjacent segments in the polygon is categorized using the processor.

Block 87 calls for calculating a parameter of the earth formation with the intersection points as input using the processor. This block relates to further processing using the valid intersection points to calculate a parameter of the earth formation using algorithms known in the art. That is, the valid intersection points with the cutting grid planes may be used to accurately describe the geometry of a subsurface structure. In that the structure may geometrically describe faults and how the faults are interconnected, the permeability of the formation may be calculated from the structure's information. Permeability can be used to determine a location and geometry for a future borehole for hydrocarbon production. Rock stress may also be calculated from the structure information as a non-limiting embodiment. For example, one of ordinary skill in the art knowing the geometry of the rock structure, the type of rock, and forces acting on the rock structure is able to calculate the rock stress. The rock stress can be used to estimate the likelihood of subsidence of the formation and earth or an earthquake occurring after extraction of hydrocarbons from the formation.

Block 88 calls for performing an action related to the earth formation using the parameter and associated equipment for performing the action. Non-limiting embodiments of the action include (1) drilling a new borehole at a location that was selected using the calculated permeability discussed above, (2) drilling the new borehole using drilling parameters determined from the calculated stress, (3) provide geo-steering information for drilling the new borehole resulting in the drilling borehole having suitable geometry for extracting hydrocarbons, and (4) extracting hydrocarbons using production parameters determined from the calculated stress.

Other frames of reference may be used that provide other rule sets different from the rule sets presented in FIG. 6. It can be appreciated though that these other frames of reference can be transformed into the frame of reference related to the rule sets presented in FIG. 6 and that the method 80 may include that transformation of the frame of reference so that the rule set of FIG. 6 is applicable.

It can be appreciated that the methods disclosed herein may be performed in two-dimensions and/or three dimensions. When performed in two-dimensions, the cutting planes in the cutting grid can be interpreted as cutting lines.

Set forth below are some embodiments of the foregoing disclosure:

Embodiment 1

A method for determining an intersection between a polygon representing a boundary of a surface in an earth formation and a plane, the method comprising: receiving a polygon representing a boundary of a surface in an earth formation using a processor, the polygon comprising a series of straight segments with a point at each end of each of the segments; overlaying a cutting grid comprising grid planes over the polygon using the processor; identifying a specific pattern that represents a first segment adjacent to a second segment in the polygon by proceeding from the first segment to the second segment in a selected rotational direction using the processor; matching the specific pattern to a reference pattern using the processor, the reference pattern comprising indication that the point between the first segment and the second segment is an intersection point or a non-intersection point based on pattern criteria comprising a position the first segment with respect to a cutting plane in the cutting grid, a position of the second segment with respect to the cutting plane, and the rotational direction going from the first segment to the second segment; categorizing the point between the two adjacent segments as an intersection point or as a non-intersection point based on the reference pattern using the processor; iterating the identifying, the matching, and the categorizing for each pair of adjacent segments in the polygon such that each point between adjacent segments in the polygon is categorized using the processor; calculating a parameter of the earth formation with the intersection points as input using the processor; and performing an action related to the earth formation using the parameter and associated equipment for performing the action.

Embodiment 2

The method according to claim 1, wherein the surface is a surface of a fault.

Embodiment 3

The method according to claim 2, wherein the parameter is stress at the surface of the fault.

Embodiment 4

The method according to claim 3, wherein the action comprises drilling a borehole into the earth formation with a drilling fluid pressure window that is compatible with the calculated stress.

Embodiment 5

The method according to claim 1, wherein the parameter is permeability and the method further comprises estimating an amount of producible hydrocarbons.

Embodiment 6

The method according to claim 1, wherein the reference pattern comprises a plurality of reference patterns.

Embodiment 7

The method according to claim 6, wherein the plurality of reference patterns comprises the following cases: case a—first segment is above the plane, second segment is above the plane, clockwise rotational direction and point is an intersection point; case b—first segment is below the plane, second segment is below the plane, clockwise rotational direction and point is an intersection point; case c—first segment is above the plane, second segment is above the plane, counter-clockwise rotational direction and point is a non-intersection point; case d—first segment is below the plane, second segment is below the plane, counter-clockwise rotational direction and point is a non-intersection point; case e—first segment is above the plane, second segment is below the plane, clockwise or counter-clockwise rotational direction and point is an intersection point; case f—first segment is below the plane, second segment is above the plane, clockwise or counter-clockwise rotational direction and point is an intersection point; case g—first segment is on the plane, second segment is above the plane, clockwise rotational direction and point is an intersection point; case h—first segment is on the plane, second segment is below the plane, counter-clockwise rotational direction and point is a non-intersection point; case i—first segment is above the plane, second segment is on the plane, clockwise rotational direction and point is an intersection point; case j—first segment is below the plane, second segment is on the plane, counter-clockwise rotational direction and point is a non-intersection point; case k—first segment is above the plane, second segment is on the plane, counter-clockwise rotational direction and point is a non-intersection point; case l—first segment is below the plane, second segment is on the plane, clockwise rotational direction and point is an intersection point; case m—first segment is on the plane, second segment is above the plane, counter-clockwise rotational direction and point is a non-intersection point; case n—first segment is on the plane, second segment is below the plane, clockwise rotational direction and point is an intersection point; and case o—first segment is on the plane, second segment is on the plane, clockwise or counter-clockwise rotational direction and point is a non-intersection point.

Embodiment 8

The method according to claim 6, wherein the plurality of reference patterns comprises a reduced set of reference patterns that comprises the following cases: case I—first and second segments are either (1) both below the plane, (2) both above the plane, or (3) one of the segments is on the plane, then with clockwise rotational direction the point is an intersection point, and with counter-clockwise rotational direction the point is a non-intersection point; case II—first and second segments are opposing wherein one segment is above the plane and the other segment is below the plane, then the point is an intersection point; and case III—first and second segments are both on plane, then the point is a non-intersection point.

Embodiment 9

The method according to claim 1, wherein the method is performed in two-dimensions and/or three-dimensions.

Embodiment 10

A system for determining an intersection between a polygon representing a boundary of a surface in an earth formation and a plane, the system comprising: a memory having computer readable instructions; and a processor for executing the computer-readable instructions, the computer-readable instructions comprising: receiving a polygon representing a boundary of a surface in an earth formation, the polygon comprising a series of straight segments with a point at each end of each of the segments; overlaying a cutting grid comprising grid planes over the polygon; identifying a specific pattern that represents a first segment adjacent to a second segment by proceeding from the first segment to the second segment in a selected rotational direction; matching the specific pattern to a reference pattern, the reference pattern comprising indication that the point between the first segment and the second segment is an intersection point or a non-intersection point based on pattern criteria comprising a position the first segment with respect to a cutting plane in the cutting grid, a position of the second segment with respect to the cutting plane, and the rotational direction going from the first segment to the second segment; categorizing the point between the two adjacent segments as an intersection point or as a non-intersection point based on the reference pattern; iterating the identifying a specific pattern, the identifying a reference pattern, and the categorizing the point for each pair of adjacent segments in the polygon so that each point between adjacent segments in the polygon is categorized; calculating a parameter of the earth formation with the intersection points as input; equipment configured for performing an action related to the earth formation using the parameter.

Embodiment 11

The computer-readable instructions according to claim 10, wherein the surface is a surface of a fault.

Embodiment 12

The computer-readable instructions according to claim 11, wherein the parameter is stress at the surface of the fault.

Embodiment 13

The computer-readable instructions according to claim 12, wherein the action comprises drilling a borehole into the earth formation with a drilling fluid pressure window that is compatible with the calculated stress.

Embodiment 14

The computer-readable instructions according to claim 10, wherein the parameter is permeability and the method further comprises estimating an amount of producible hydrocarbons.

Embodiment 15

The computer-readable instructions according to claim 10, wherein the reference pattern comprises a plurality of reference patterns.

Embodiment 16

The computer-readable instructions according to claim 15, wherein the plurality of reference patterns comprises the following cases: case a—first segment is above the plane, second segment is above the plane, clockwise rotational direction and point is an intersection point; case b—first segment is below the plane, second segment is below the plane, clockwise rotational direction and point is an intersection point; case c—first segment is above the plane, second segment is above the plane, counter-clockwise rotational direction and point is a non-intersection point; case d—first segment is below the plane, second segment is below the plane, counter-clockwise rotational direction and point is a non-intersection point; case e—first segment is above the plane, second segment is below the plane, clockwise or counter-clockwise rotational direction and point is an intersection point; case f—first segment is below the plane, second segment is above the plane, clockwise or counter-clockwise rotational direction and point is an intersection point; case g—first segment is on the plane, second segment is above the plane, clockwise rotational direction and point is an intersection point; case h—first segment is on the plane, second segment is below the plane, counter-clockwise rotational direction and point is a non-intersection point; case i—first segment is above the plane, second segment is on the plane, clockwise rotational direction and point is an intersection point; case j—first segment is below the plane, second segment is on the plane, counter-clockwise rotational direction and point is a non-intersection point; case k—first segment is above the plane, second segment is on the plane, counter-clockwise rotational direction and point is a non-intersection point; case l—first segment is below the plane, second segment is on the plane, clockwise rotational direction and point is an intersection point; case m—first segment is on the plane, second segment is above the plane, counter-clockwise rotational direction and point is a non-intersection point; case n—first segment is on the plane, second segment is below the plane, clockwise rotational direction and point is an intersection point; and case o—first segment is on the plane, second segment is on the plane, clockwise or counter-clockwise rotational direction and point is a non-intersection point.

Embodiment 17

The computer-readable instructions according to claim 15, wherein the reference pattern comprises a reduced set of reference patterns that comprises the following cases: case I—first and second segments are either (1) both below the plane, (2) both above the plane, or (3) one of the segments is on the plane, then with clockwise rotational direction the point is an intersection point, and with counter-clockwise rotational direction the point is a non-intersection point; case II—first and second segments are opposing wherein one segment is above the plane and the other segment is below the plane, then the point is an intersection point; and case III—first and second segments are both on plane, then the point is a non-intersection point.

Embodiment 18

The computer-readable instructions according to claim 10, wherein the method is performed in two-dimensions and/or three-dimensions.

In support of the teachings herein, various analysis components may be used, including a digital and/or an analog system. For example, the computer processing system 12, the downhole sensor 13, the drilling/production parameter controller 14, the geo-steering system 15, the seismic source 16, the seismic receiver 17, the downhole electronics 18, and/or the telemetry may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" and the like are intended to be inclusive such that there may be additional elements other than the elements listed. The conjunction "or" when used with a list of at least two terms is intended to mean any term or combination of terms.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for transforming at least one of an earth formation, drilling equipment, and production equipment based on determining an intersection between a polygon representing a boundary of a surface in an earth formation and a plane, the method comprising:

receiving a polygon representing a boundary of a surface in an earth formation using a processor, the polygon comprising a series of straight segments with a point at each end of each of the segments;

overlaying a cutting grid comprising grid planes over the polygon using the processor;

identifying a specific pattern that represents a first segment adjacent to a second segment in the polygon by proceeding from the first segment to the second segment in a selected rotational direction using the processor;

matching the specific pattern to a reference pattern using the processor, the reference pattern comprising indication that the point between the first segment and the second segment is an intersection point or a non-intersection point based on pattern criteria comprising a position the first segment with respect to a cutting plane in the cutting grid, a position of the second segment with respect to the cutting plane, and the rotational direction going from the first segment to the second segment;

categorizing the point between the two adjacent segments as an intersection point or as a non-intersection point based on the reference pattern using the processor;

iterating the identifying, the matching, and the categorizing for each pair of adjacent segments in the polygon such that each point between adjacent segments in the polygon is categorized using the processor;

calculating a parameter of the earth formation with the intersection points as input using the processor; and transforming at least one of the earth formation, drilling equipment, and production equipment using the parameter of the earth formation.

2. The method according to claim 1, wherein the surface is a surface of a fault.

3. The method according to claim 2, wherein the parameter is stress at the surface of the fault.

4. The method according to claim 3, wherein transforming the earth formation comprises drilling a borehole into the earth formation with a drilling fluid pressure window that is compatible with the calculated stress.

5. The method according to claim 1, wherein the parameter is permeability and the method further comprises estimating an amount of producible hydrocarbons.

6. The method according to claim 1, wherein the reference pattern comprises a plurality of reference patterns.

7. The method according to claim 6, wherein the plurality of reference patterns comprises the following cases:

case a—first segment is above the plane, second segment is above the plane, clockwise rotational direction and point is an intersection point;

case b—first segment is below the plane, second segment is below the plane, clockwise rotational direction and point is an intersection point;

case c—first segment is above the plane, second segment is above the plane, counter-clockwise rotational direction and point is a non-intersection point;

case d—first segment is below the plane, second segment is below the plane, counter-clockwise rotational direction and point is a non-intersection point;

case e—first segment is above the plane, second segment is below the plane, clockwise or counter-clockwise rotational direction and point is an intersection point;

case f—first segment is below the plane, second segment is above the plane, clockwise or counter-clockwise rotational direction and point is an intersection point;

case g—first segment is on the plane, second segment is above the plane, clockwise rotational direction and point is an intersection point;

case h—first segment is on the plane, second segment is below the plane, counter-clockwise rotational direction and point is a non-intersection point;

case i—first segment is above the plane, second segment is on the plane, clockwise rotational direction and point is an intersection point;

case j—first segment is below the plane, second segment is on the plane, counter-clockwise rotational direction and point is a non-intersection point;

case k—first segment is above the plane, second segment is on the plane, counter-clockwise rotational direction and point is a non-intersection point;

case l—first segment is below the plane, second segment is on the plane, clockwise rotational direction and point is an intersection point;

case m—first segment is on the plane, second segment is above the plane, counter-clockwise rotational direction and point is a non-intersection point;

case n—first segment is on the plane, second segment is below the plane, clockwise rotational direction and point is an intersection point; and case o—first segment is on the plane, second segment is on the plane, clockwise or counter-clockwise rotational direction and point is a non-intersection point.

8. The method according to claim 6, wherein the plurality of reference patterns comprises a reduced set of reference patterns that comprises the following cases:

case I—first and second segments are either (1) both below the plane, (2) both above the plane, or (3) one of the segments is on the plane, then with clockwise rotational direction the point is an intersection point, and with counter-clockwise rotational direction the point is a non-intersection point;

case II—first and second segments are opposing wherein one segment is above the plane and the other segment is below the plane, then the point is an intersection point; and case III—first and second segments are both on plane, then the point is a non-intersection point.

9. The method according to claim 1, wherein the method is performed in two-dimensions and/or three-dimensions.

10. A system for transforming at least one of an earth formation, drilling equipment, and production equipment based on determining an intersection between a polygon representing a boundary of a surface in an earth formation and a plane, the system comprising:

a memory having computer readable instructions; and a processor for executing the computer-readable instructions, the computer-readable instructions comprising:

receiving a polygon representing a boundary of a surface in an earth formation, the polygon comprising a series of straight segments with a point at each end of each of the segments;

overlaying a cutting grid comprising grid planes over the polygon;

identifying a specific pattern that represents a first segment adjacent to a second segment by proceeding from the first segment to the second segment in a selected rotational direction;

matching the specific pattern to a reference pattern, the reference pattern comprising indication that the point between the first segment and the second segment is an intersection point or a non-intersection point based on pattern criteria comprising a position the first segment with respect to a cutting plane in the cutting grid, a position of the second segment with respect to the cutting plane, and the rotational direction going from the first segment to the second segment;

categorizing the point between the two adjacent segments as an intersection point or as a non-intersection point based on the reference pattern;

iterating the identifying a specific pattern, the identifying a reference pattern, and the categorizing the point for each pair of adjacent segments in the polygon so that each point between adjacent segments in the polygon is categorized;

calculating a parameter of the earth formation with the intersection points as input;

at least one of drilling equipment configured to drill a borehole in the earth formation and production equipment configured to produce hydrocarbons from the earth formation in order to transform the earth formation using the parameter of the earth formation, wherein drilling the borehole transforms the drilling equipment and producing hydrocarbons transforms the production equipment.

11. The computer-readable instructions according to claim 10, wherein the surface is a surface of a fault.

12. The computer-readable instructions according to claim 11, wherein the parameter is stress at the surface of the fault.

13. The computer-readable instructions according to claim 12, wherein transforming the earth formation comprises drilling a borehole into the earth formation with a drilling fluid pressure window that is compatible with the calculated stress.

14. The computer-readable instructions according to claim 10, wherein the parameter is permeability and the method further comprises estimating an amount of producible hydrocarbons.

15. The computer-readable instructions according to claim 10, wherein the reference pattern comprises a plurality of reference patterns.

16. The computer-readable instructions according to claim 15, wherein the plurality of reference patterns comprises the following cases:

case a—first segment is above the plane, second segment is above the plane, clockwise rotational direction and point is an intersection point;

case b—first segment is below the plane, second segment is below the plane, clockwise rotational direction and point is an intersection point;

case c—first segment is above the plane, second segment is above the plane, counter-clockwise rotational direction and point is a non-intersection point;

case d—first segment is below the plane, second segment is below the plane, counter-clockwise rotational direction and point is a non-intersection point;

case e—first segment is above the plane, second segment is below the plane, clockwise or counter-clockwise rotational direction and point is an intersection point;

case f—first segment is below the plane, second segment is above the plane, clockwise or counter-clockwise rotational direction and point is an intersection point;

case g—first segment is on the plane, second segment is above the plane, clockwise rotational direction and point is an intersection point;

case h—first segment is on the plane, second segment is below the plane, counter-clockwise rotational direction and point is a non-intersection point;

case i—first segment is above the plane, second segment is on the plane, clockwise rotational direction and point is an intersection point;

case j—first segment is below the plane, second segment is on the plane, counter-clockwise rotational direction and point is a non-intersection point;

case k—first segment is above the plane, second segment is on the plane, counter-clockwise rotational direction and point is a non-intersection point;

case l—first segment is below the plane, second segment is on the plane, clockwise rotational direction and point is an intersection point;

case m—first segment is on the plane, second segment is above the plane, counter-clockwise rotational direction and point is a non-intersection point;

case n—first segment is on the plane, second segment is below the plane, clockwise rotational direction and point is an intersection point; and case o—first segment is on the plane, second segment is on the plane, clockwise or counter-clockwise rotational direction and point is a non-intersection point.

17. The computer-readable instructions according to claim 15, wherein the reference pattern comprises a reduced set of reference patterns that comprises the following cases:

case I—first and second segments are either (1) both below the plane, (2) both above the plane, or (3) one of the segments is on the plane, then with clockwise rotational direction the point is an intersection point, and with counter-clockwise rotational direction the point is a non-intersection point;

case II—first and second segments are opposing wherein one segment is above the plane and the other segment is below the plane, then the point is an intersection point; and case III—first and second segments are both on plane, then the point is a non-intersection point.

18. The computer-readable instructions according to claim 10, wherein the method is performed in two-dimensions and/or three-dimensions.

* * * * *